(12) United States Patent
Karabacak et al.

(10) Patent No.: US 10,782,199 B2
(45) Date of Patent: Sep. 22, 2020

(54) PRESSURE SENSOR AND SENSOR SYSTEM COMPRISING ONE OR MORE PRESSURE SENSORS

(71) Applicant: OPTICS11 B.V., Amsterdam (NL)

(72) Inventors: Devrez Mehmet Karabacak, Leidschendam (NL); Bastiaan Meulblok, Leidschendam (NL); German Enrique Knoppers, Leidschendam (NL)

(73) Assignee: OPTICS11 B.V. (NL)

( * ) Notice: Subject to any disclaimer, the term of this patent is extended or adjusted under 35 U.S.C. 154(b) by 143 days.

(21) Appl. No.: 15/781,892

(22) PCT Filed: Dec. 9, 2016

(86) PCT No.: PCT/NL2016/050864
§ 371 (c)(1),
(2) Date: Jun. 6, 2018

(87) PCT Pub. No.: WO2017/099602
PCT Pub. Date: Jun. 15, 2017

(65) Prior Publication Data
US 2018/0364122 A1  Dec. 20, 2018

(30) Foreign Application Priority Data
Dec. 11, 2015 (NL) ..................................... 2015952

(51) Int. Cl.
*G01L 11/02* (2006.01)
*G01L 7/06* (2006.01)
(Continued)

(52) U.S. Cl.
CPC ............ *G01L 11/025* (2013.01); *G01L 7/065* (2013.01); *G01L 9/0039* (2013.01); *G01L 13/02* (2013.01)

(58) Field of Classification Search
USPC .................................................... 73/700–756
See application file for complete search history.

(56) References Cited

U.S. PATENT DOCUMENTS 5,317,918 A     6/1994  Lew
5,767,411 A  *  6/1998  Maron ............... G01D 5/35383
                                                              73/705
(Continued)

FOREIGN PATENT DOCUMENTS

CN     101324188 A     12/2008
CN     104977119 A     10/2015
(Continued)

OTHER PUBLICATIONS

International Search Report and Written Opinion; PCT Application No. PCT/NL2016/050864; dated Mar. 27, 2017.
(Continued)

*Primary Examiner* — Andre J Allen
(74) *Attorney, Agent, or Firm* — Polsinelli PC

(57) ABSTRACT

The present document relates to a pressure sensor comprising a structural element, the structural element comprising a first and second structural part. The sensor further comprises a first cavity being in fluid connection with an exterior of the sensor for establishing a first pressure which is dependent on an external pressure in the first cavity and a second cavity configured to be at a second pressure in use. A deformable structure is deformable dependent on a pressure difference between the first pressure and the second pressure. The sensor comprises a fiber including an intrinsic fiber optic sensor fixed to the structural element and to the deformable structure for providing an optical sensor signal dependent on said pressure difference.

15 Claims, 7 Drawing Sheets

(51) Int. Cl.
*G01L 9/00* (2006.01)
*G01L 13/02* (2006.01)

(56) References Cited

U.S. PATENT DOCUMENTS

| | | | |
|---|---|---|---|
| 6,016,702 A * | 1/2000 | Maron | G01L 9/0039 |
| | | | 73/705 |
| 6,422,084 B1 * | 7/2002 | Fernald | G01L 11/025 |
| | | | 73/705 |
| 6,740,866 B1 | 5/2004 | Bohnert et al. | |
| 6,820,489 B2 | 11/2004 | Fernald et al. | |
| 2006/0163456 A1 | 7/2006 | Wittrisch et al. | |
| 2014/0123764 A1 * | 5/2014 | Abtahi | G01L 11/025 |
| | | | 73/705 |
| 2018/0156643 A1 * | 6/2018 | Knoppers | G01L 1/246 |

FOREIGN PATENT DOCUMENTS

| | | |
|---|---|---|
| WO | 2015023176 A1 | 2/2015 |
| WO | 2015076670 A2 | 5/2015 |
| WO | 2015076670 A3 | 5/2015 |
| WO | 2017099602 A1 | 6/2017 |

OTHER PUBLICATIONS

English abstract of CN104977119; retrieved from www.espacenet.com on Dec. 13, 2019.

English abstract of CN101324188; retrieved from www.espacenet.com on Dec. 13, 2019.

* cited by examiner

PRESSURE SENSOR AND SENSOR SYSTEM COMPRISING ONE OR MORE PRESSURE SENSORS

CROSS-REFERENCE TO RELATED APPLICATIONS

This application is a national stage application of International Application No. PCT/NL2016/050864, which was filed on Dec. 9, 2016, which claims priority to Netherlands Application Number 2015952 filed on Dec. 11, 2015, of which is incorporated by reference in its entirety.

FIELD OF THE INVENTION

The present invention is directed at a sensor for sensing a physical parameter, such as a pressure sensor. The present invention is further directed at a sensor system comprising one or more of pressure sensors as described above.

BACKGROUND

In the field of sensors, the sensors that apply an intrinsic fiber optic sensor unit are known to potentially provide a very accurate reading of the pressure to be measured. This is due to the accuracy of intrinsic fiber optic sensors themselves. An intrinsic fiber optic sensor is a sensor that comprises an optical fiber that is lit with an optical signal. Any changes to the fiber caused by external factors, such as mechanically induced forces on the fiber, can be accurately sensed by monitoring the characteristics of the optical signal using an interrogator.

To allow monitoring of a physical parameter, such as the pressure, some known types of sensors apply a structural element comprising two structural parts, and a deformable structure or element in between the two parts that deforms dependent on the physical parameter to be measured in the monitored environment of the sensor. The fiber containing the intrinsic fiber optic sensor is connected between the two parts such that a deformation of the deformable element results in a change in strain within the fiber. This causes the characteristics of an optical output signal of the intrinsic fiber optic sensor to change, which in turn can be accurately determined using an interrogator unit and a suitable analysis system.

Sensors as described above can be used in a large variety of applications and fields of technology. Although the above sensors potentially provide a very accurate signal which is indicative of the physical parameter in the environment of the sensor, the sensors of this type are frequently prone to various disturbance factors that prevent the potential accuracy from being achieved. One disadvantage, for example, is that these sensors may be prone to external vibrations acting on the sensor. An external vibration acting on the sensor may for example be picked up by the deformable element and result in a measurable change in the characteristics of the optical output signal of the sensitive intrinsic fiber optic sensor. To some extent, such vibrations may be filtered from the signal using an analysis system. However, as the skilled person will appreciate, the disturbance will affect the overall accuracy of the sensor especially if measurements need to be at a fast pace that does not allow for filtering to occur.

In one typical application, the sensor may be a pressure sensor or a system of pressure sensors. The pressure sensors may for example be used to continuously monitor the pressure in each of the on board oil containers in an oil tanker. This is for example necessary to monitor the build up of hydro-carbon gas, which may become a major safety risk in the oil tanker. On board, however, some disturbance factors causing vibrations that may be picked up by the pressure sensors include for example the running engines of the ship, the rocking and rolling of the vessel on the waves or high seas, and various operations performed on board. For example the vibrations caused by waves are of a relatively long and sometimes inconsistent wavelength, and are thus difficult to filter from the signal. These vibrations thereby may cause incorrect pressure readings.

In addition to the above, other disturbance factors may cause the accuracy of the sensor to be diminished or degrade over time. These may be caused for example by temperature changes in the environment, or by the degrading of the fixing of the fiber to the structural parts causing a gradual change in tension.

SUMMARY OF THE INVENTION

It is an object of the present invention to provide a pressure sensor wherein the above disadvantages have been overcome or made controllable, and which enables to accurately monitor the pressure over a period of time.

To this end, there is provided herewith a sensor for sensing a physical parameter comprising a structural element including a first and second structural part, the sensor further comprising an input member arranged in the first structural part and configured for receiving a force exerted thereon dependent on said physical parameter, the sensor further comprising a transfer element cooperating with the input member for transferring the force exerted on the input member, and a counter element cooperating with the transfer element providing a displaceable interposed section in between the counter element and the transfer element, wherein the displaceable interposed section is displaceable dependent on the force exerted by the transfer element and a counterforce exerted by the counter element, the sensor further comprising a fiber including an intrinsic fiber optic sensor for providing an optical sensor signal dependent on the physical parameter, wherein the fiber is fixed to the first structural part, the interposed section, and the second structural part, wherein the intrinsic fiber optic sensor of the fiber comprises a first intrinsic fiber optic sensor arranged between the first structural part and the interposed section, and a second intrinsic fiber optic sensor arranged between the second structural part and the interposed section.

In accordance with the present invention, the first structural part and the second structural part are of a fixed distance relative to each other, and the transfer and counter elements are arranged in between the first and second part. The fiber including the intrinsic fiber optic sensor is fixed both to the first structural part and to the second structural part, and is further fixed to the interposed section between the transfer and counter elements. The interposed section may for example include an element to which the fiber may be fixed, although the fiber may also be fixed directly to one or both of the transfer and counter element, on their interface with each other. A first intrinsic fiber optic sensor is then located in the part of the fiber arranged between the first structural part and the interposed section, and a second intrinsic fiber optic sensor is located in the part of the fiber located between the second structural part and the interposed section. In this arrangement, a change in the external pressure monitored by the pressure sensor results in a similar change in the first pressure of the first cavity, thereby causing a translation of the interposed section. This results in a change in fiber tension in the first intrinsic fiber optic sensor, as well as an equal change of opposite sign in the fiber tension of the second intrinsic fiber optic sensor. Accordingly the lengths of the first and second intrinsic fiber optic sensor will change. From this, the physical parameter may be determined accurately from the optical output signals of the first intrinsic fiber optic sensor and the second intrinsic fiber optic sensor. The intrinsic fiber optic sensor may for example be (or include) fiber Bragg gratings (FBG). This would result in a change of wavelength of a reflected fraction of the optical signal, reflected by the FBG.

Advantageously, a vibration caused by an external source on the sensor will be equally felt by both the first and second bellows. This results in a relative vibration of the interposed section in relation to the first and second part. However, the transfer and counter element may mechanically be considered as two springs that counterbalance each other. A sideways vibration may therefore cause a sideways deflection of the interposed section, and because the interposed section is held by both the transfer and counter element, the sideways movement of the interposed section will be more or less a straight line transverse to the fiber orientation. Therefore, this will result in an equal increase of tension in both the first and the second intrinsic fiber optic sensor of a same sign. The reflected wavelength of both the first and second intrinsic fiber optic sensor, where both include an FBG, will change equally and with a same sign. Since the physical parameter reading is obtained from the change in difference between the reflected wavelengths, the sideways motion of the interposed section will not affect the reading. This prevents such a sideways vibration to influence the physical parameter reading of the sensor. The above will not be achievable in an unbalanced configuration (i.e. as in the prior art) where the movement of a deformable element in response to sideways vibration will cause a different and in most cases an error that cannot be removed from the measurements. Vibrations that have a component which is aligned with the fiber, result in an equal change in the fiber tension of the first and second intrinsic fiber optic sensors which is of opposite sign. It will be appreciated, because the interposed section must be movable in between the transfer and counter element, such vibrations can not be prevented from being picked up by the interposed section. However, in absence of disturbance factors caused by sideways vibrational components in directions transverse to the fiber the only remaining aligned component of the vibrations can be more easily recognized and removed from the output signal. Moreover, because of the mechanical balance between the bellows, the system is less sensitive for components of the vibration that are aligned with the fiber. In other words, from any arbitrary vibration exerted on the pressure sensor, only the (small) component aligned with the intrinsic fiber optic sensor may result in a noticeable change in the optical signal. Such disturbance can be easily removed by analysis alone.

In addition to the above, the sensor in accordance with the present invention is also less prone to other disturbance factors that may influence accurate physical parameter readings. For example, a known problem of conventional pressure sensors (and other similar sensors) of this type is that the fixing of the fiber, which is usually fixed to the first and the deformable elements, degrades over time. This causes the fiber tension to change over time, during the lifetime of the sensor. As a result, the pressure sensor has to be calibrated frequently to allow accurate reading of the pressure. In the sensor of the present invention, degrading of the fixing of the fiber to one or all of the glued connections between the fiber and the first structural part, the second structural part, and the interposed section, will not influence the measuring of the physical parameter. This is because an overall change in tension of the fiber will result in a change in fiber tension in the first intrinsic fiber optic sensor and in the second intrinsic fiber optic sensor which is of equal magnitude and of a same sign. Likewise, changes in fiber tension caused by temperature changes also do not influence the parameter reading provided by the sensor, because these will affect both intrinsic fiber optic sensors equally.

In accordance with some embodiments, the sensor is a pressure sensor, the sensor further comprises a first cavity being in fluid connection with an exterior of the sensor via an inlet for establishing a first pressure which is dependent on an external pressure in the first cavity, and a second cavity configured to be at a second pressure in use, wherein the transfer element comprises a first bellows or membrane connected to the first structural part, and wherein the counter element comprises a second bellows or membrane connected to the second structural part, the first bellows being in fluid connection with the first cavity and the second bellows being in fluid connection with the second cavity, and wherein displaceable interposed section is arranged between the first bellows or membrane and the second bellows or membrane for being displaceable dependent on said pressure difference. The advantages of the present invention are particularly useful for these types of sensors, e.g. where these are applied in situations wherein accuracy of measurements may be prone to external vibrations, or by creep over time. For example, on boats or in industrial applications.

Herein below, reference will many times be made to these type of sensors (i.e. pressure sensors), referring to first and second bellows instead of transfer element and counter element respectively. However, the inventive concept described above could be applied to any other type of sensor wherein a physical parameter is measured by applying a parameter dependent force. For example, these physical parameters could be strain, tilt, temperature, pressure, pull, etcetera.

In accordance with preferred embodiments, the fiber is pre-stressed such as to be held at a tension between the first and second structural part. Pre-stressing the fiber allows to provide a sensor signal from both the first and the second intrinsic fiber optic sensor, regardless of whether the first pressure is higher than the second pressure or vice versa. This thereby increases the range of pressures that may be measured using the pressure sensor of the present invention. For example, but not necessarily, the pre-stressing or tension may be such that in use relief of the fiber between the first structural part and the interposed section and between the interposed section and the second structural part, dependent on the pressure difference, may be prevented.

In accordance with yet another embodiment of the present invention, the fiber is located exterior to the first and second bellows of the pressure sensor. In particular the first and second bellows are respectively in fluid connection with, or at least partly comprise the first and second cavity. Where the first cavity is in fluid connection with the environment to be monitored, any gases in this environment will also be present in the first cavity a pressure sensor arrangement wherein the fiber is located exterior to the bellows provides an arrangement wherein the fiber is not exposed to the gases of the exterior environment of the pressure sensor to be monitored. For example, if the pressure sensor is used for monitoring the pressure of hydrocarbon vapours in a cargo container of an oil tanker, these hydrocarbon vapours will also be present in the first cavity, which is in fluid connection with the exterior environment to be monitored. Therefore, by installing the fiber including the intrinsic fiber optic sensors such as to be external to the first and second bellows, the fiber is not exposed to the hydrocarbon vapours that may affect the properties of the fiber, its coating, the optical properties of the intrinsic sensor or the attachment adhesives used in the sensor at the grade operation of the intrinsic fiber optic sensors over time. Furthermore, by keeping the fiber external to the fluid environment being measured, for many situations, it can be expected that the fiber and the intrinsic fiber sensor experience less extreme temperature ranges and as such can be expected to perform with less degradation and longer lifetime with higher accuracy.

In accordance with yet other embodiments, the fiber is arranged such as to lead following a path from the first structural part via the interposed section to the second structural part. The interposed section moving in between the first and second part dependent on the pressure difference between the first pressure and the second pressure will move in a direction parallel to the path of the fiber.

Yet in accordance with other embodiments the fiber is arranged such as to follow a path having a first section from the first structural part via the interposed section to the second structural part, and a second section from the second structural part via the interposed section back to the first structural part, wherein the fiber is fixed at least once at each passage with the first structural part, the interposed section and the second structural part along the path of the fiber. This results in a symmetric arrangement wherein the fiber further restricts any sideways moments of the interposed section, transverse to the fiber direction. By restraining movement in this direction, the pressure sensor becomes even less sensitive to any external vibrations, thereby providing a more accurate sensor signal.

In accordance with yet other embodiments the first and second intrinsic fiber optic sensor are located in at least one of the first section of the path or the second section of the path, or in both sections. It will be appreciated, in these symmetric embodiments, it is at the choice of the skilled person whether the first intrinsic fiber optic sensor and the second intrinsic fiber optic sensor will be located in the first section or the second section of the path of the fiber. Changes in the translational direction of the interposed section will likewise be felt on either side, i.e. in both the first and the second section. Strictly spoken, it is even not necessary that both the first intrinsic fiber optic section and the second intrinsic fiber optic sensor are located in a same section of the path of the fiber. For example, the first fiber optic sensor may even be located in the first section of the path, while the second intrinsic fiber optic sensor may be located in the second section. This may be impractical for other reasons, but it falls within the scope of the present invention. As referred to above, at the choice of the skilled person, first intrinsic fiber optic sensors may be located in both the first and second part of the path of the fiber, and second intrinsic fiber sensor may also be located in both first and second section of the path of the fiber. The impact of additional intrinsic fiber optic sensors on the accuracy of the pressure sensor may not be large, but some improvement may be achieved.

In accordance with yet other embodiments of the present invention, the path of the fiber is arranged over an outer surface of the first and second structural part, wherein the fiber is fixed to a periphery of the interposed section. These embodiments appear to be most practical in terms of manufacturing the pressure sensor and fixing of the fibers thereto.

In accordance with yet other embodiments of the invention, the second pressure is maintained at a constant base pressure which is different from an atmospheric pressure. By applying a constant base pressure which is larger than an atmospheric pressure, the pressure sensor can be made sensitive to higher pressure ranges. For example, by bringing the second cavity at a second pressure equal to 10 bar, an equilibrium between the first and the second pressure is reached around the 10 bar base pressure in the second cavity. Pressure differences around the base pressure of 10 bar can then be measured using the pressure sensors of the present invention. As will be appreciate, the base pressure may be any pressure. This also includes pressures below atmospheric pressure.

In accordance with some embodiments of the invention, one or more stopper elements may be located between the interposed section and the first structural part or between the interposed section and the section structural part, for restraining the displacement of the interposed section when the first pressure is smaller or smaller than the second pressure. In particular in the embodiments wherein the second pressure is maintained at a constant based pressure which is larger or smaller than the atmospheric pressure. This will cause the interposed section to be pressed against the stopper elements at pressures that are significantly below or above the base pressure in the second cavity. The use of such stopper elements may, dependent on the base pressure in the second cavity, be advantageous or sometimes even necessary to prevent damage to the fiber. As will be appreciated, in cases wherein the second pressure may be maintained at a constant base pressure which is smaller than an atmospheric pressure, stopper elements may for example be located between the interposed section and the second structural part for restraining displacement of the interposed section when the first pressure is larger than the second pressure. The embodiment of the invention with stopper systems allows pressure gauges that only become active at a certain pressure range but with much higher accuracy. For example, for a pressure gauge that needs to only measure small variations in pressure (e.g. in a range of +/−1 bar) around an elevated pressure (e.g. 25 bar) the second pressure can be pre-filled to middle of the range (e.g. 25 bar) and stoppers placed such that the intermediate element becomes free to move when the first pressure chamber reaches the lower measurement bound (e.g. 24 bar) with sufficient flexibility of the moving elements that the pressure changes from there on can be measured with high accuracy. In systems without the balancing and stopper elements, the pressure transduction elements would need to be sufficiently rigid to handle up to the highest pressure level which would result in significantly higher rigidity and therefore loss of sensitivity and accuracy.

In accordance with further embodiments of the present invention, the fiber further comprises a temperature sensor, the temperature sensor being formed by a third intrinsic fiber optic sensor located on the outer surface of the first or second structural part, wherein the fiber is fixed to said respective first of second structural part or both sides of the third intrinsic fiber optic sensor. In particular, preferably the structural element or the first or second structural part to which the third intrinsic fiber optic sensor for sensing the temperature is fixed, is made of a material having a large thermal expansion coefficient, such as to allow accurate determination of the temperature. For example, this may be a metal such as a suitable type of steel.

In accordance of some of these embodiments, the temperature sensor is located on the first structural part at a pressure inlet for providing said fluid connection between the first cavity and the exterior of the sensor. In this embodiment, the temperature sensor is thereby closely located to the parts that are in fluid connection with the external environment to be monitored by the pressure sensor, therefor allowing the temperature of the external environment to be monitored accurately.

In accordance with other embodiments, the pressure sensor comprises a further pressure inlet for providing a fluid connection between a second cavity and the exterior of the sensor. In principle, the second cavity may be a closed cavity having no fluid connection with an exterior of the sensor at all, such as to provide a differential pressure measurement between the second in the second cavity and the first pressure (which is dependent on the exterior pressure) such as to provide pressure reading. In the present embodiments, both the first cavity and the second cavity comprise a pressure inlet which provides a fluid connection with respectively the first cavity and the second cavity. Differential pressure reading can be obtained between two pressure areas, e.g. between two pressure containers, or between an environment inside a pressure container and outside a pressure container, or the alike. As such three types of pressure gauges can be obtained with one system; differential, relative and absolute, such that the end user can switch between them even in the field of operation with different connectors allowing for a versatile sensor unit. The skilled person will recognize the applications wherein the pressure sensor in accordance with these embodiments may be advantageously applied.

In accordance with the second aspect of the present invention there is provided a sensor system comprising an optical energy source for providing an optical input signal, one or more pressure sensors according to the first aspect of the invention and an optical interrogator unit, wherein the one or more pressure sensors are connected to the optical energy source for receiving the optical input signal, and wherein the optical interrogator unit is connected to the one or more pressure sensors for receiving an optical output signal from at least one of said pressure sensors and for providing a system output signal based on the received optical output signal for analysis by an analysis system.

In accordance with a third aspect, there is provided a pressure sensor comprising a structural element including a first and second structural part, the sensor further comprising a first cavity being in fluid connection with an exterior of the sensor for establishing a first pressure which is dependent on an external pressure in the first cavity, and a second cavity configured to be at a second pressure in use, further comprising a first bellows or membrane connected to the first structural part and a second bellows or membrane connected to the second structural part, the first bellows comprising or being in fluid connection with the first cavity and the second bellows comprising or being in fluid connection with the second cavity, and wherein the first bellows or membrane and the second bellows or membrane cooperate with each other such as to provide a displaceable interposed section there between, wherein the interposed section is displaceable dependent on said pressure difference, and wherein the sensor comprises a fiber including a first and a second intrinsic fiber optic sensor for providing an optical sensor signal dependent on said pressure difference, wherein the fiber is fixed to the first structural part, the interposed section, and the second structural part, wherein the first intrinsic fiber optic sensor is arranged between the first structural part and the interposed section, and the second intrinsic fiber optic sensor is arranged between the second structural part and the interposed section.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
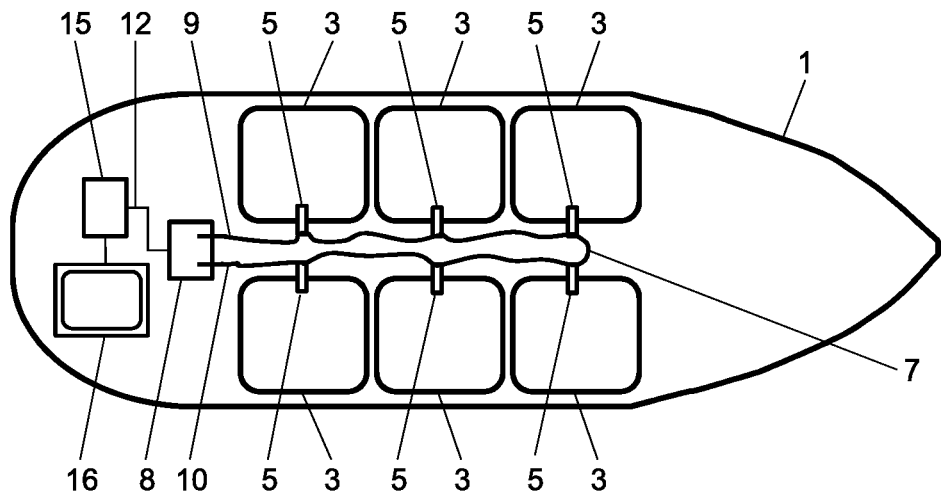
FIG. 1 schematically illustrates an oil tanker comprising a sensor system in accordance with the present invention.

The pressure sensors and sensor systems described in this document may be applied in many different types of applications and are not intended to be limited to any of the particular applications that are described herein. As an example, a specific application of a pressure system in an oil tanker 1 is schematically illustrated in FIG. 1. A skilled person will however appreciate that pressure sensors may be applied in many different situations in all kinds of industry and scientific applications, such as to measure or monitor fluid pressures for example in fluids such as gasses or liquids. The pressure sensors in accordance with the present invention can be applied both as absolute pressure sensors to determine an absolute pressure of a fluid, for example tuned to a specific measurement range of pressures. Alternatively, the pressure sensors in accordance with the present invention may also be applied to measure differential pressures, e.g. pressure differences between the first and the second fluid container. The pressure sensors in accordance with the invention are reliable in the sense that the accuracy of the pressure readings do not degrade over time due to "creep" (i.e. degrading of fixing force of fiber to structural parts). Also temperature effects and vibrations do not prevent accurate measurement of the pressure.

FIG. 1 schematically illustrates an oil tanker 1 comprising a plurality of oil repositories or containers 3. The oil containers 3 will be used for storing oil during transportation thereof at sea. A known safety risk at oil tankers, such as oil tanker 1, is that hydrocarbon gasses may build up in the containers 3 during transportation. The risk of leakage and potentially resulting in an explosion or fire on board increases when the pressure increases with the continuing build up upon gasses. Therefore, to prevent this from becoming dangerous, the pressure in each of the storage tanks 3 is monitored using pressure sensors 5. Each of the tanks 3 comprises the pressure sensor 5 as illustrated in FIG. 1. The pressure sensors 5 enable to continuously monitor the pressure in each tank 3.

The pressure sensors used in the sensor system in FIG. 1 apply intrinsic fiber optic sensors which allow to continuously and accurately monitor the pressure. Therefor, the pressure sensors 5 are interconnected by a fiber 7. An interrogator 8 comprises optical ports 9 and 10. For example optical port 9 allows to send an optical signal into the fiber 7, while at the same time serving as an input for any reflected optical signal fraction received from fiber 7. Optical port 10 eventually receives the optical signal sent into fiber 7 via optical port 9, except for any portions that are reflected and are therefor absent in the optical signal at optical port 10. The interrogator system 8 thus allows to provide an optical signal to the fiber 7, and to measure and determine the reflected components at optical port 9 and transmitted fractions of the optical signal which are received at optical port 10. This information received by interrogator unit 8 is provided to an analysis system 15 via connection 12. The analysis system 15 may be any suitable type of computer or processor that allows to analyze the signal received at interrogator 8 and provide the measured pressure values of each of the pressure sensors 5 in each of the containers 3. The analysis unit 15 may be connected to a display or other suitable output means for providing monitored pressures to a user or operator, e.g. on the bridge of the oil tanker 1. As will be understood, this data may also be stored in a memory or data storage medium, or transmitted via a telecommunications network (not shown).

Figure 2:
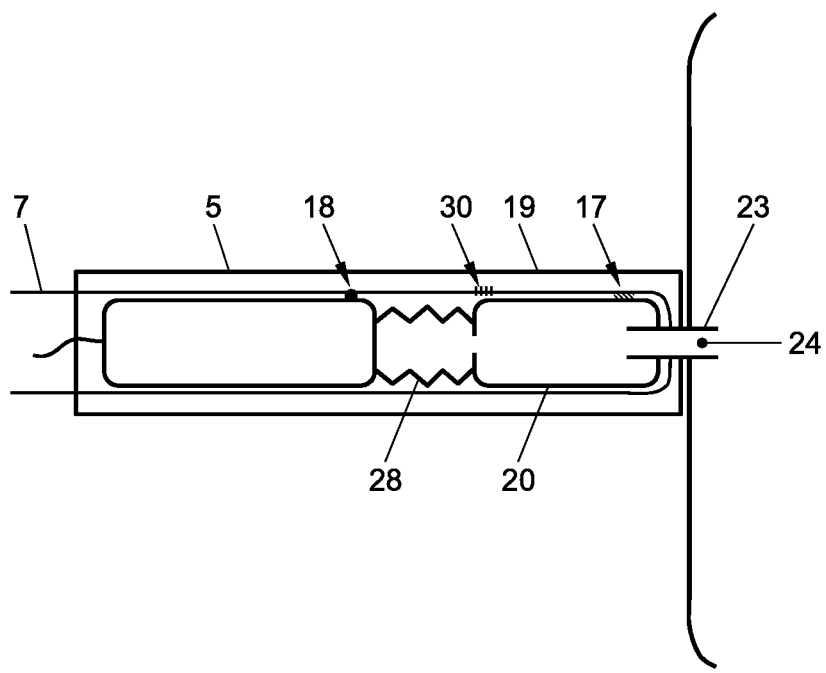
FIG. 2 schematically illustrates the main elements of a pressure sensor.

FIG. 2 schematically illustrates a pressure sensor applying an intrinsic fiber optic sensor. The pressure sensor 5 comprising a cavity 20. The cavity 20 is connected via fluid connection 24 (i.e. a channel) to an input member, i.e. inlet 23, thereby providing a fluid connection between the first cavity 20 and the interior of the container 3. The pressure in the cavity pressure 20, as a result of the fluid connection 24, will be at the same pressure as the pressure in container 3. A deformable element 28, here a bellows, connects the cavity 20 with a structural part 13. A fiber 7 enters the pressure sensor 5 via a backside, and runs past the deformable element 28 back to the backside again and out of the pressure sensor 5. The fiber 7 is connected to the structural part 13 at position 18, for example to the cavity 20 in at position 17. When the pressure in the cavity 20 changes, the deformable element 28 will change in size, as it is in fluid connection with the cavity 20. This results in a change in tension of the fiber 7 via the deformable element 28. The fiber 7 comprises in intrinsic fiber optic sensor 30, which may for example be a fiber Bragg grating (FBG). The fiber Bragg grating reflects a portion of the optical signal in the fiber 7. The reflected wavelength of the optical signal is dependent on the tension in the fiber Bragg grating. An increase in the tension applied to the FBG 30 results in an elongation of the periodic structure of the fiber Bragg grating, which in turn results in an increase of the wavelength of the reflected fraction. Likewise, a decrease in tension in the intrinsic fiber optic sensor 30 will result in a decrease of the wavelength of the reflected fraction.

Figure 3:
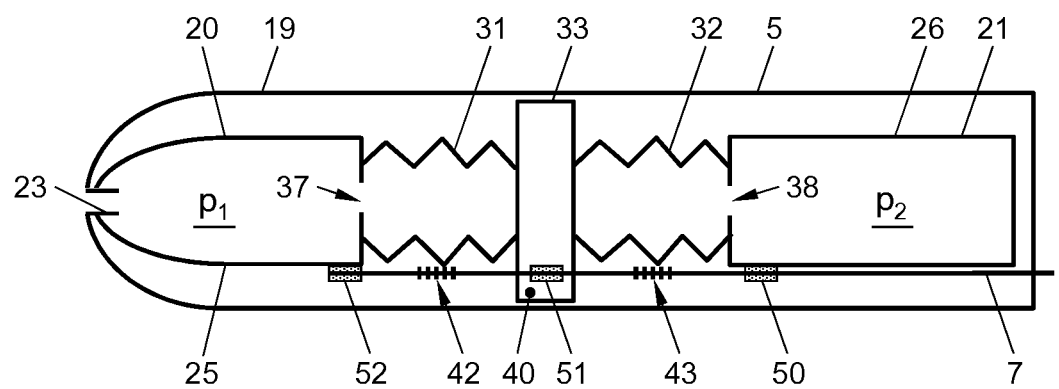
FIG. 3 schematically illustrates a pressure sensor in accordance with the present invention.

FIG. 3 schematically illustrates a pressure sensor in accordance with an embodiment of the present invention. The pressure sensor 5 comprises a channel 23 which connects the first cavity 20 with the exterior at a front side of the sector 5. The second cavity 21 does not comprise a fluid connection with the exterior of the pressure sensor 5 and is held at a second pressure $P_2$. The first cavity 20 is at a pressure $P_1$ which is dependent on the pressure exterior to the pressure sensor 5.

The first cavity 20 comprises a fluid connection 37 with a bellows 31. The bellows 31 is connection to the first cavity 20, and with its other end connected to an interposed section 33. The interposed section 33 is in FIG. 3 schematically illustrated by an element in between the first bellows 31 and the second bellows 32. Alternatively, the interposed section 33 may simply be formed by the interface between the first bellows 31 and the second bellows 32. The second cavity 21 has a fluid connection 38 with the second bellows 32. As a result, an increase in pressure $P_1$ in the first cavity 20 results in a displacement of an interposed section 33 to the right hand side of FIG. 3. A decrease in the first pressure $P_1$ in the first cavity 20 will result in a displacement of the interposed section 33 to the left hand side of the pressure sensor 5 in FIG. 3.

In the embodiment of FIG. 3, a fiber 7 is fixed with a first connection 52 to the first cavity 20 at its' ultimate end. A second connection 50 of the fiber is fixed to the second cavity 21. Moreover, the fiber 7 is fixed with a third connection 51 to the interposed section 33 in between the first bellow 31 and second bellow 32 of the pressure sensor 5. Thus, the fiber 7 does not extend further towards a next pressure sensor, i.e. the pressure sensor 5 only has an optical input which also serves as an output for the reflection of the optical signal provided to fiber 7.

The pressure sensor 5 is enclosed by a housing 19. A first structural part 25 provides the cavity 20, while a second structural part 26 provides the second cavity 21. The connection 52 of the fiber 7 is with the first structural part 25, and the connection 50 of the fiber 7 is with the second structural part 26. Because the distance between the first structural part 25 and the second structural part 26 is fixed, the tension of the fiber 7 will only change upon changing first pressure $P_1$ in the section between the connections 50 and 52.

A first intrinsic fiber optic sensor is arranged between the first structural part 25 and the interposed section 33. A second intrinsic fiber optic sensor 43 is located between the interposed section 33 and the second structural part 26. Therefore if the interposed section 33 displaces to the left in FIG. 3, the tension in the first intrinsic fiber optic sensor 42 will decrease while the tension in the second intrinsic fiber optic sensor 43 will equally increase. The changes in tension will be of equal magnitude but of opposite sign. As a result, the wavelengths of the reflected portions of the optical signal in fiber 7, which are reflected respectively by the first and second intrinsic fiber optic sensors 42 and 43, will likewise change. The wavelength of the first intrinsic fiber optic sensor 42, as a result of the decrease in tension, will likewise decrease, and the wavelength of the reflected portion of the second intrinsic fiber optic sensor 43 will increase with a same amount due the change in tension. This allows to very accurately measure the difference in pressure $P_1$ relative to the pressure $P_2$.

Figure 4:
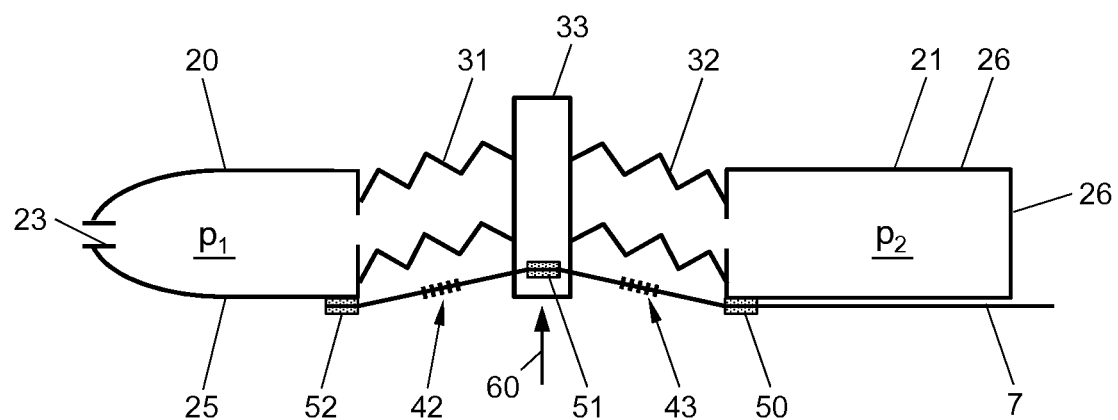
FIG. 4 schematically illustrates a sideways vibrational component acting on a pressure sensor in accordance with the present invention.

Schematically, FIG. 4 illustrates the same configuration of the pressure sensor 5 illustrated in FIG. 3, but without the housing 19. FIG. 4 schematically illustrates what happens in case a sideways vibration is exerted on the pressure sensor 5 of the FIG. 3. As can be seen on FIG. 4, the interposed section 33 in between the first cavity 20 and the second cavity 21, as a result of the sideways force 60, will displace laterally. Therefore, the fiber 7 in the sections in between the connections 52 and 51 and in between the connections 51 and 50 will both be stretched and the tension in intrinsic fiber optic sensors 42 and 43 will increase with a same amount and with a same sign. Moreover, because the interposed section 23 is held in balance between the first bellows 31 and the second bellows 32, the displacement of the interposed section 33 will be in a straight line transverse to the fiber direction 7 (this would not be the case in absence of a balance between the first bellows 31 and the second bellows 32). As a result of this balance, both fiber optic sensors 42 and 43 will experience an equal change in tension, in absence of any non-linear discrepancies due to non-linear motion of the displacement.

As a result of the increase in fiber tension of same magnitude and same sign, the reflected portions reflected by intrinsic fiber optic sensors 42 and 43 will both be characterized by a change in the reflected wavelength. However, the wavelength change in both intrinsic fiber optic sensors will be the same and of same sign and thus the wavelength difference (i.e. the separation between the two wavelength peaks in the optical spectra of the reflection) will not change. The sideways translation of the interposed section 33 will therefore not result in an incorrect reading of the pressure $P_1$.

Figure 5:
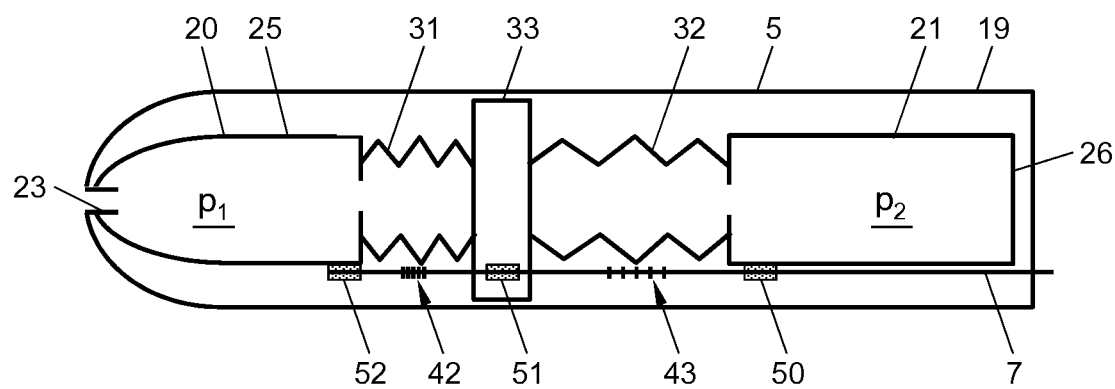
FIG. 5 illustrates a longitudinal vibrational component acting on a pressure sensor in accordance with the present invention.

FIG. 5 schematically illustrates the influence of a longitudinal vibration exerted on the pressure sensor 5 of FIG. 3. The vibration experienced by the pressure sensor 5 is directed in the same direction as the fiber 7. This vibration will be experienced and result in a displacement of the interposed section 33 in between the first structural part 25 and the second structural part 26 of the pressure sensor. As illustrated in FIG. 5, the interposed section 33 displaces to the left hand side of the figure, resulting in an elongation of the second intrinsic fiber optic sensor 43 and a compression of the first intrinsic fiber optic sensor 42. Therefore, the vibration component illustrated in FIG. 5 will result in a wavelength change in the first intrinsic fiber optic sensor 42 and in the second intrinsic fiber optic sensor 43 which is of a same magnitude and of opposite sign, just like a wavelength change caused by a changed in pressure $P_1$. However, the sensitivity of the pressure sensor 5 to vibrations is now restricted to vibration in only one direction (i.e. in line with the fiber 7), while the vibrational components in the two transverse directions no longer influence the measurements. As will be appreciated, the remaining vibrational components for which pressure sensor 5 is sensitive is more easy to remove from the pressure readings by an analysis system, because it is a single component vibration and does not comprise non-linear discrepancies.

The pressure sensor in accordance with the present invention has additional major advantages over conventional pressure sensors, both based on optical fibers and electrical ones. One further important advantage of the pressure sensor of the present invention, is that the sensor is insensitive to change in operational characteristics as a result of wear over the lifetime of the pressure sensor. In particular, the fiber 7, at least in between the connections 50 and 52, is pre-stressed such as to enable correct sensing of both increase and decrease of the pressure $P_1$. However, with conventional sensors, over time it is experienced that connections such as connections 50 and 52 will slightly release over time resulting in a decrease of overall tension in the fiber. This phenomenon is called "creep" and results in a drift of the sensor calibration values and as such introduces inaccuracies which can be of significant level. As a result of the specific configuration of the pressure sensors of the present invention, the pressure sensor 5 is not sensitive to creep caused by release of the connections 50 and 52. As will be appreciated, the effect of creep on the pre-stressing of the fiber is that the fiber tension will overall decrease. However, such a decrease in fiber tension caused by creep is experienced the same in the first intrinsic fiber optic sensor 42 and the second intrinsic fiber optic sensor 43. Therefore, as with the sideways components of vibrations illustrated in FIG. 4, an overall decrease in fiber tension caused by creep of the connections 50 and 52 will not result in a change in the wavelength difference between the wavelengths of the first intrinsic fiber optic sensor and the second intrinsic fiber optic sensor reflected via fiber 7. Hence, the pressure sensor 5 of the present invention is not sensitive to creep. The same is true for changes in fiber tension caused by a change in temperature of the pressure sensor. As will be appreciated, the temperature of the pressure sensor 5 in the oil tanker 1 will be largely dependent on the outside temperature on board the oil tanker 1. Hence, if the oil tanker 1 sails in the Arctic ocean, the outside temperature will be much colder than when the oil tanker 1 sails through the tropical seas. As a result of the configuration of the pressure sensor 5 of the present invention, a change in temperature of the pressure sensor 5 will result in a wavelength change of the reflected wavelength of the first intrinsic optic fiber sensor 42 and the second intrinsic fiber optic sensor 43 which is of a same magnitude and of a same sign, and will thus not result in a change in wavelength difference between these wavelengths. Therefore, this change in temperature will not result in an incorrect reading of the pressure. It will be appreciated, though, that dependent on the particular application wherein the pressure sensor 5 is used, it may be informative to retrieve information on the specific temperature of the pressure sensor. This may be obtained, for example, by using an additional thermal sensor, which could be in the form of an additional intrinsic fiber optic sensor, as will be shown in FIGS. 8 and 10.

Figure 11:
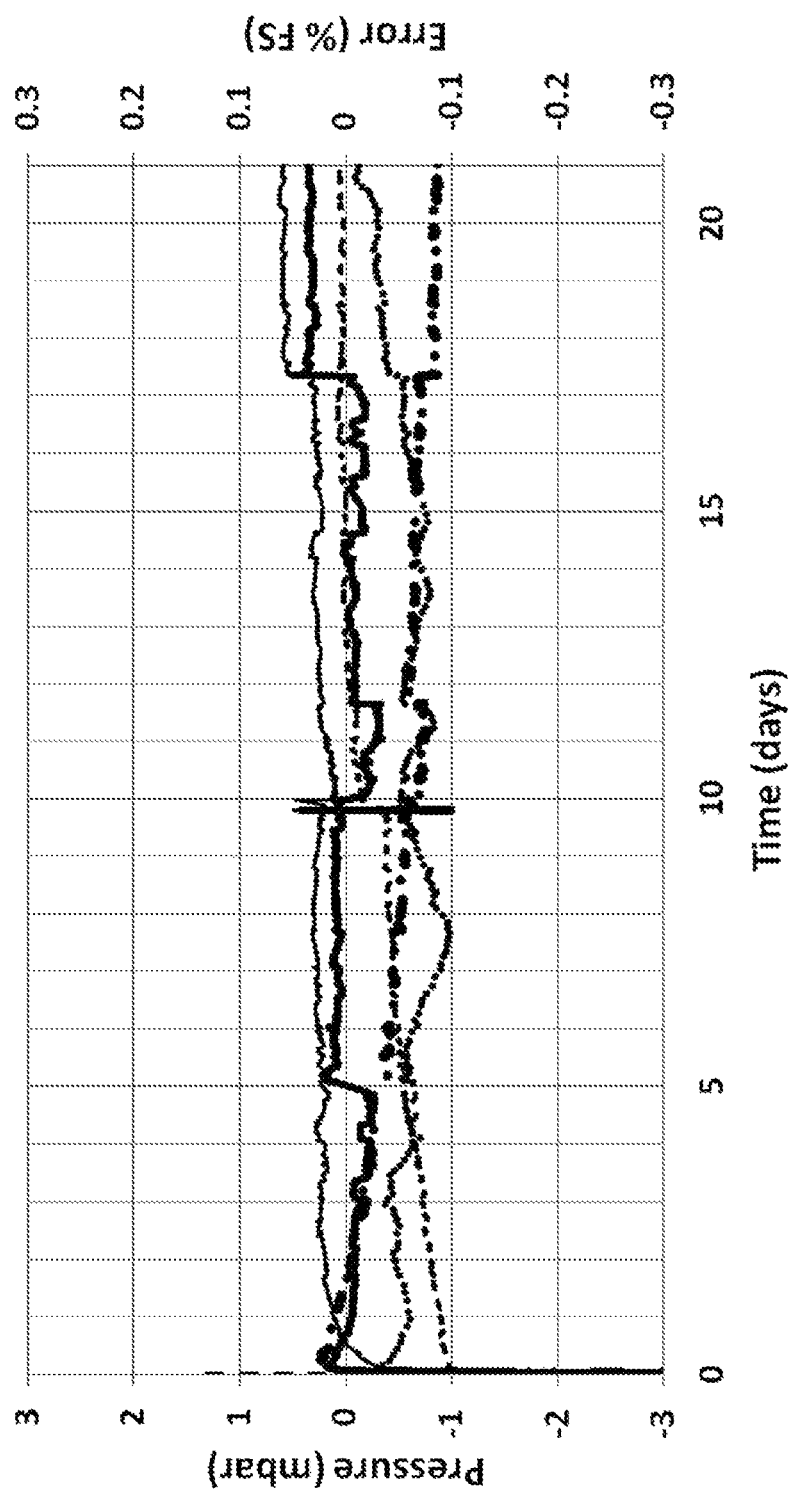
FIG. 11 is a graph of results of a measurement performed with five sensors in accordance with the invention, showing the measurement error over time.
Figure 12:
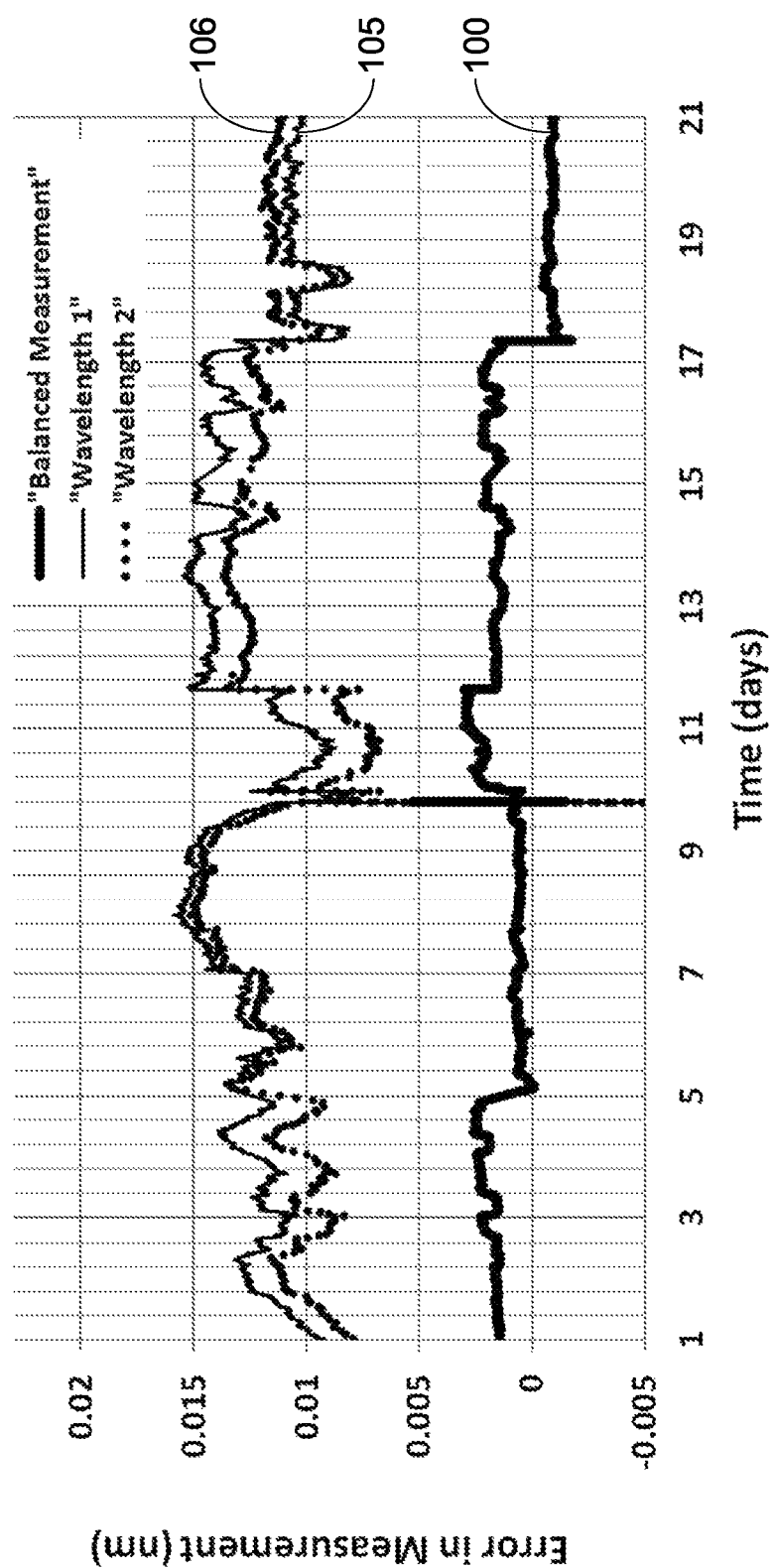
FIG. 12 is a graph of the measured wavelengths of a pressure sensor of the present invention, as well as their difference over time.

As an example of the improvements achieved in terms of accuracy and insensitivity with respect to creep or temperature changes, FIGS. 11 and 12 have been included. FIG. 11, for example, shows the results of a recording of the pressure using five different sensors for a month under elevated temperature such as to accelerate the process of creep. In the graph, the difference between the pairs of wavelengths for each sensor is plotted as the error (percentage fiber strain (% FS)). The graph shows that the accuracy remains within +/−0.1% over the full measurement scale during all of the experiment. Moreover, the graph also shows no slope that may be indicative of building up error which would be an indication of creep for long term. Also a second plot is shown in FIG. 12 whereby the changes (errors, caused by temperature/creep/vibration) in the individual wavelengths is shown as opposed the variations (errors) in their difference. This graph shows the improvement achieved, i.e. the flatness of the thick solid line 100 in view of the variations in the wavelengths in each fiber (the thin solid line 105 and the dotted line 106).

Figure 6:
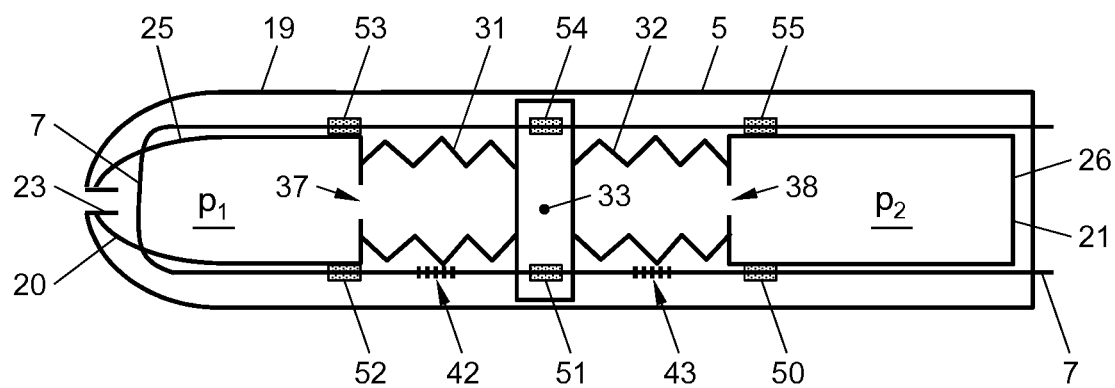
FIG. 6 illustrates pressure sensor in accordance with a further embodiment of the present invention.

A different embodiment of the present invention is illustrated in FIG. 6. In FIG. 6, the fiber 7 extends past the connection 52 by running across the first structural part 25 towards the other side thereof, and back towards the backside of the pressure sensor 5. The fiber 7 is further connected to the first structural part 25 by connection 53, to the interposed section 33 by connection 54 and to the second structural part 26 by connection 55. Preferably, the default tension in between connection 50 and 52 is equal to the tension between connections 53 and 55 (thereby being only dependent on the displacement of the interposed section 33). The advantages of this embodiment is that the fiber 7 may be extended towards a further pressure sensor, such as to provide a configuration as schematically illustrated in FIG. 1 with a plurality of pressure sensors 5 in a sensor system. A further advantage of the embodiment of FIG. 6, is that by keeping tension in the fiber 7 on both sides of the interposed section 33 (i.e. in the first section between connections 50 and 52 and in the second sections between connections 53 and 55) the same, sideways displacement of the interposed sections 33 is further counteracted by the fiber 7 itself.

Figure 7:
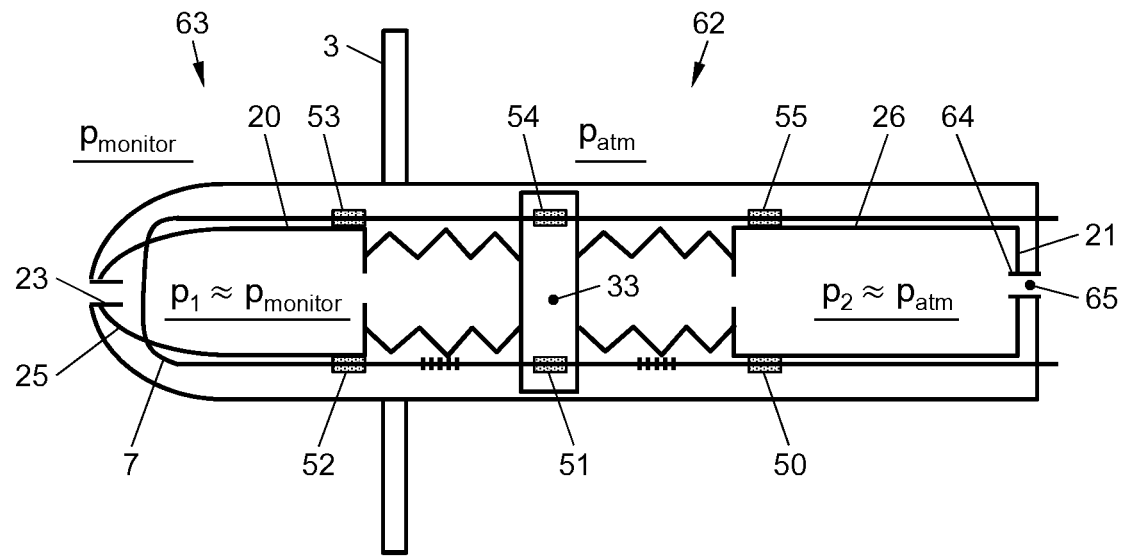
FIG. 7 schematically illustrates the pressure sensor with the present invention in accordance with the further embodiment.

A further embodiment is illustrated in FIG. 7. In the embodiment in FIG. 7 similar to the embodiment of FIG. 6, the fiber 7 runs via both sides of the interposed section 33 such as to allow connection to the fiber to the further pressure sensor 5 as illustrated in FIG. 1. In the embodiment illustrated in FIG. 7, an additional fluid connection 65 is provided by channel 64 between second cavity 21 and the exterior 62 of the pressure sensor 5. The front side of the pressure sensor with channel 23 is inserted in a container 3 (the wall of which is schematically illustrated in FIG. 7). The first pressure $P_1$ is substantially the same as the pressure $P_{monitor}$ in area 63 inside container 3 to be monitored by the pressure sensor 5. The pressure $P_2$ in the second cavity 21 is substantially equal to the atmospheric pressure $P_{atm}$ in environment 62 outside the container 3. Therefor the embodiment of the pressure sensor 5 illustrated in FIG. 7 allows to measure the pressure difference between the pressures inside and outside the storage container 3.

Figure 8:
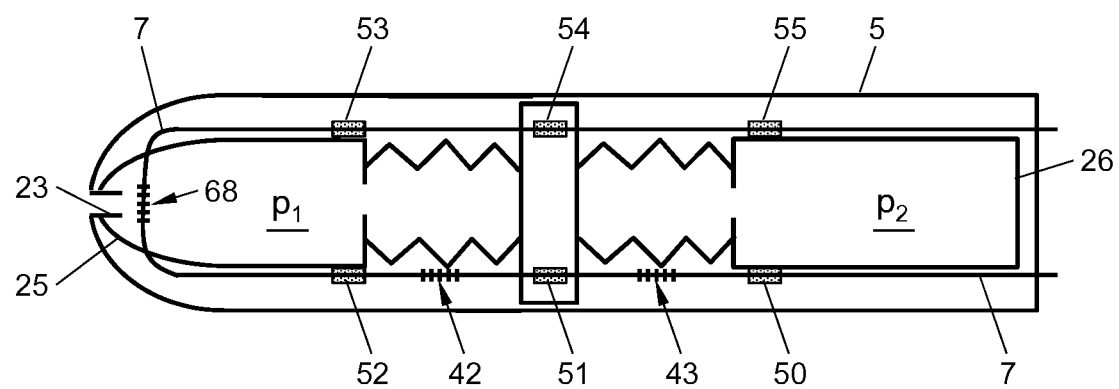
FIG. 8 schematically illustrates a pressure sensor in accordance with the present invention in accordance with the further embodiment.

Further embodiment of the pressure sensor 5 of the present invention is illustrated in FIG. 8. In FIG. 8, the fiber 7 comprises a third intrinsic fiber optic sensor 68 which allows to measure the temperature of the pressure sensor near the channel 23. The intrinsic fiber optic sensor 68 may for example be connected to the first structural part 25 on either side of the intrinsic fiber optic sensor 68. The first structural part 25 may for example be constructed out of steel or another material that is sensitive to temperature changes. For example the thermal expansion coefficient of the material of the first structural part 25 may be relatively large such as to cause a measurable thermal expansion of the first structural part 25 upon a change in temperature. This, likewise, results in a change of the reflected wavelength of the additional intrinsic fiber optic sensor 68 in the embodiment of FIG. 8, making the temperature directly measurable in additional to the pressure $P_1$.

Figure 9:
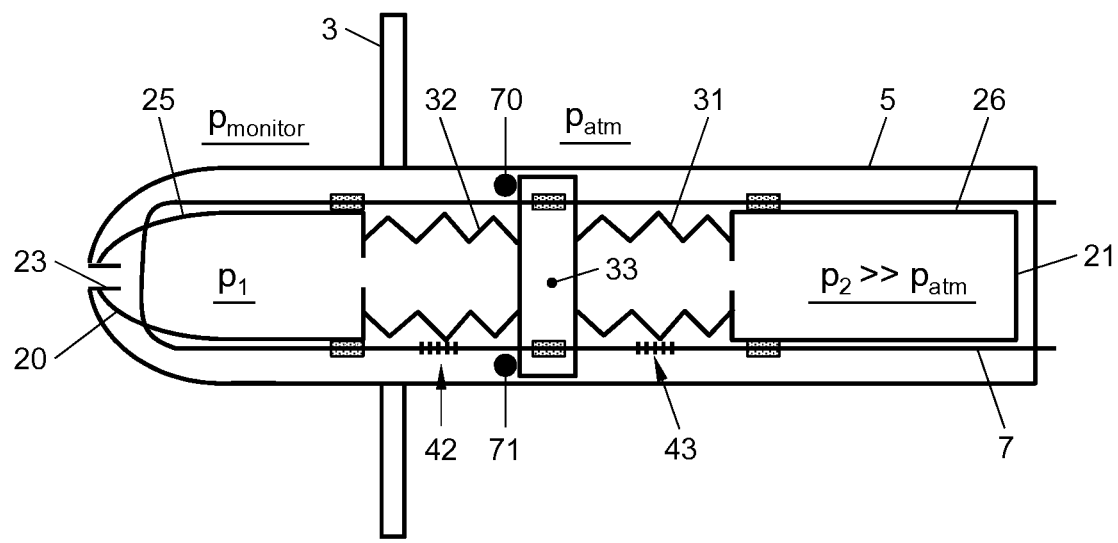
FIG. 9 schematically illustrates a pressure sensor in accordance with the present invention in accordance with the further embodiment.

In the embodiment of FIG. 9, a fluid connection between the second cavity 21 and the exterior of the pressure sensor 5 is absent, but the pressure $P_2$ in the second cavity 21 is much larger then the atmospheric pressure $P_{atm}$. For example, the pressure $P_2$ in the second cavity may be at a pressure of 5 bar, or 10 bar, or 15 bar or any other value desired. As will be appreciated, this will enable to use the pressure sensor 5 to monitor pressure values which are more or less similar to the pressure $P_2$ in the second cavity 21. For example, if $P_2$ is at 10 bar, the pressure sensor 5 is suitable for sensing pressures $P_{monitor}=P_1$ around 10 bar. Additionally, to prevent damage to the sensor 5 in case the pressure $P_1$ is much smaller than $P_2$ (for example when the sensors are not in use), one or more stopper elements 70, 71 provide a maximum displacement of the interposed section 33 to prevent damage to the flexible elements 31,32 and to fiber 7 and to the intrinsic fiber optic sensors 43 and 42.

Figure 10:
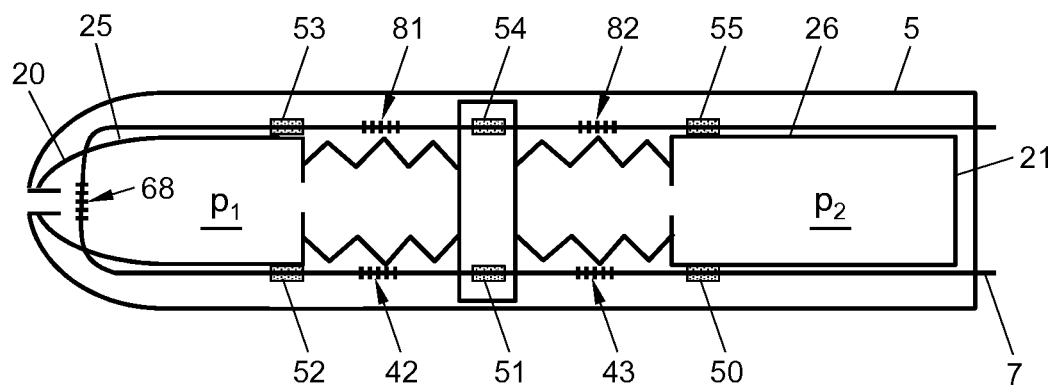
FIG. 10 schematically illustrates a pressure sensor in accordance with the present invention in accordance with yet a further embodiment.

A further embodiment of the present invention is illustrated in FIG. 10. In FIG. 10, the fiber 7 comprises additional intrinsic fiber optic sensors 81 and 82 in the second section between the connections 53 and 55. As will be appreciated, the intrinsic fiber optic sensors 81 and 82 will provide additional sensor signals reflected therefrom that can be analyzed via interrogator 8 and analysis system 15 of FIG. 1.

As will be appreciated, the reflected fractions of the optical sensor, which are reflected by the intrinsic fiber optic sensors in each of the pressure sensors 5 of a sensor system, may be measured in backward direction (by directly measuring the reflected portion) or in forward direction (by sensing the missing fractions of the optical signal in fiber 7). In the embodiment of FIG. 3, only the reflected fraction can be sensed by an interrogator 8 because the fiber 7 ends within the sensor 5. The other embodiments illustrated in FIGS. 6 through 10 allow to measure both the reflected fractions as well as the forwarded fractions of the optical signal to perform analysis thereof. Furthermore, the embodiments illustrated in FIGS. 6 through 10 allow for multiple sensors to be connected on one fiber line in a sequence whereby the intrinsic fiber optic sensors are manufactured in a way such that they reflect different portions of the light sent through the fiber such that all of them can be recorded by analysis system 15 of FIG. 1 simultaneously either by looking at the total spectra of the reflected signal or transmitted signal and in a way such that due to the uniqueness of the light reflected from each sensor, changes optically observed can be traced back and attributed to changes observed in each sensor.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the scope of the invention, as is determined by the claims. The invention may be practiced otherwise then as specifically described herein, and is only limited by the appended claims.

The invention claimed is:

1. A sensor for sensing a physical parameter comprising:
   a structural element comprising a first and second structural part;
   an input member arranged in the first structural part and configured for receiving a force exerted thereon dependent on the physical parameter;
   a transfer element coupled to the input member for transferring the force exerted on the input member;
   a counter element coupled to the transfer element providing a displaceable interposed section in between the counter element and the transfer element, wherein the displaceable interposed section is displaceable dependent on the force exerted by the transfer element and a counterforce exerted by the counter element; and
   a fiber comprising an intrinsic fiber optic sensor configured to provide an optical sensor signal dependent on the physical parameter,
   wherein the fiber is fixed to the first structural part, the interposed section, and the second structural part, and wherein the intrinsic fiber optic sensor comprises a first intrinsic fiber optic sensor arranged between the first structural part and the interposed section, and a second intrinsic fiber optic sensor arranged between the second structural part and the interposed section.

2. The sensor according to claim 1, wherein the sensor is a pressure sensor, and further comprising:
   a first cavity being in fluid connection with an exterior of the sensor via an inlet for establishing a first pressure which is dependent on an external pressure in the first cavity, and
   a second cavity configured to be at a second pressure in use;
      a first bellows or membrane connected to the first structural part; and
      a second bellows or membrane connected to the second structural part, the first bellows being in fluid connection with the first cavity and the second bellows being in fluid connection with the second cavity,
      wherein the displaceable interposed section is arranged between the first bellows or membrane and the second bellows or membrane for being displaceable dependent on the pressure difference.

3. The sensor according to claim 1, wherein the fiber is pre-stressed to be held at a tension between the first and second structural part.

4. The sensor according to claim 2, wherein the fiber is located exterior to the first and the second bellows.

5. The sensor according to claim 1, wherein the fiber is arranged to lead following a path from the first structural part via the interposed section to the second structural part.

6. The sensor according to claim 1, wherein the fiber is arranged to follow a path having a first section from the first structural part via the interposed section to the second structural part, and a second section from the second structural part via the interposed section back to the first structural part, wherein the fiber is fixed at least once at each passage with the first structural path, the interposed section, and the second structural path, along the path of the fiber.

7. The sensor according to claim 6, wherein the first and second intrinsic fiber optic sensors are located in at least one of the first section of the path or the second section of the path.

8. The sensor according to claim 5, wherein the path of the fiber is arranged over an outer surface of the first and second structural part, wherein the fiber is fixed to a periphery of the interposed section.

9. The sensor according to claim 2, wherein the second pressure is maintained at a constant base pressure different from an atmospheric pressure.

10. The sensor according to claim 2, further comprising:
    one or more stopper elements located between the interposed section and the first structural part, or between the interposed section and the second structural part, and
    configured to restrain displacement of the interposed section when the first pressure is smaller or larger than the second pressure.

11. The sensor according to claim 1, wherein the fiber further comprising a temperature sensor, the temperature sensor being formed by a third intrinsic fiber optic sensor located on an outer surface of the first or second structural part, wherein the fiber is fixed to the respective first or second structural part on both sides of the third intrinsic fiber optic sensor.

12. The sensor according to claim 11, wherein the temperature sensor is located on the first structural part at a pressure inlet configured to provide the fluid connection between the first cavity and the exterior of the sensor.

13. The sensor according to claim 2, further comprising a pressure inlet configured to provide a fluid connection between the second cavity and the exterior of the sensor.

14. A sensor system comprising:
    an optical energy source configured to provide an optical input signal;
    at least one sensor for sensing a physical parameter comprising:
       a structural element comprising a first and second structural part;
       an input member arranged in the first structural part and configured for receiving a force exerted thereon dependent on the physical parameter;
       a transfer element coupled to the input member for transferring the force exerted on the input member;
       a counter element coupled to the transfer element providing a displaceable interposed section in between the counter element and the transfer element, wherein the displaceable interposed section is displaceable dependent on the force exerted by the transfer element and a counterforce exerted by the counter element;
       a fiber comprising an intrinsic fiber optic sensor configured to provide an optical sensor signal dependent on the physical parameter,
       wherein the fiber is fixed to the first structural part, the interposed section, and the second structural part, and wherein the intrinsic fiber optic sensor comprises:
          a first intrinsic fiber optic sensor arranged between the first structural part and the interposed section; and
          a second intrinsic fiber optic sensor arranged between the second structural part and the interposed section,
          wherein the at least one sensor is connected to the optical energy source and configured to receive the optical signal; and
    an optical interrogator unit connected to the at least one sensor and configured to receive an optical output signal from the at least one sensor and configured to provide a system output signal based on the received optical output signal for analysis by an analysis system.

15. A sensor comprising:

a structural element comprising a first and second structural part;

a first cavity being in fluid connection with an exterior of the sensor for establishing a first pressure which is dependent on an external pressure in the first cavity, and a second cavity configured to be at a second pressure in use;

a first bellows or membrane connected to the first structural part and a second bellows or membrane connected to the second structural part, the first bellows comprising or being in fluid connection with the first cavity and the second bellows comprising or being in fluid connection with the second cavity, wherein the first bellows or membrane and the second bellows or membrane coupled with each other to provide a displaceable interposed section there between, and wherein the interposed section is displaceable dependent on the pressure difference; and a fiber comprising a first and a second intrinsic fiber optic sensor configured to provide an optical sensor signal dependent on the pressure difference, wherein the fiber is fixed to the first structural part, the interposed section, and the second structural part, and wherein the first intrinsic fiber optic sensor is arranged between the first structural part and the interposed section, and the second intrinsic fiber optic sensor is arranged between the second structural part and the interposed section.

* * * * *